United States Patent
Tanaka

(10) Patent No.: US 9,239,971 B2
(45) Date of Patent: Jan. 19, 2016

(54) IMAGE PROCESSING APPARATUS, METHOD, AND PROGRAM PRODUCT DETERMINING SHOW-THROUGH OF IMAGE FORMED ON TRANSLUCENT PRINT MEDIUM

(71) Applicant: CANON KABUSHIKI KAISHA, Tokyo (JP)

(72) Inventor: Hirotomo Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/630,671

(22) Filed: Feb. 25, 2015

(65) Prior Publication Data

US 2015/0248596 A1  Sep. 3, 2015

(30) Foreign Application Priority Data

Mar. 3, 2014  (JP) .................................. 2014-040663

(51) Int. Cl.
*H04N 1/00* (2006.01)
*G06K 15/02* (2006.01)
*G06K 15/00* (2006.01)

(52) U.S. Cl.
CPC ............ *G06K 15/023* (2013.01); *G06K 15/002* (2013.01); *H04N 1/00005* (2013.01); *H04N 1/0005* (2013.01); *H04N 1/00034* (2013.01); *H04N 1/00037* (2013.01); *H04N 1/00063* (2013.01); *H04N 1/00076* (2013.01); *H04N 1/00092* (2013.01); *G06K 15/027* (2013.01); *H04N 1/00045* (2013.01); *H04N 1/00087* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,889,405 B2 * | 2/2011 | Takami | .............. | H04N 1/00482 358/1.9 |
| 8,411,327 B2 * | 4/2013 | Yamagishi | ............... | H04N 1/40 358/1.9 |
| 8,693,051 B2 * | 4/2014 | Szafraniec | ........... | H04N 1/4072 358/1.9 |
| 9,025,170 B2 * | 5/2015 | Nakamura | ........... | H04N 1/4095 358/1.13 |

FOREIGN PATENT DOCUMENTS

JP  2011-112681 A  6/2011

* cited by examiner

*Primary Examiner* — Scott A Rogers
(74) *Attorney, Agent, or Firm* — Fitzpatrick, Cella, Harper & Scinto

(57) ABSTRACT

An image processing apparatus including: a unit configured to acquire a translucency reference value indicating optical translucency in a specified translucent printing medium; a show-through determination unit configured to determine whether an image that is formed on the translucent printing medium in accordance with print data shows through by determining whether there exists a difference between the density of a pixel in the print data and the density specified by the acquired translucency reference value and whether the density of the pixel in the print data is lower than the density specified by the translucency reference value; and a first determination unit configured to determine whether a user should be notified of information about whether an image that is formed on the translucent printing medium in accordance with the print data shows through in accordance with the results of the determination by the show-through determination unit.

12 Claims, 13 Drawing Sheets

Detailed setting [Semitransparent film (ML1)]

| | |
|---|---|
| Basis weight | Edit |
| Surface properties | Edit |
| Color | Edit |
| Translucency reference value | Test chart printing |
| Expected blurring ratio | 80 |
| Curl amount correction | Edit |

Close

FIG.6A

Detailed setting [Plain sheet]

| | |
|---|---|
| Basis weight | Edit |
| Surface properties | Edit |
| Color | Edit |
| Translucency reference value | Test chart printing |
| Expected blurring ratio | 80 |
| Curl amount correction | Edit |

Close

FIG.6B

Test chart printing

Check printed test chart from
front side and register lowest density (%)
at which patch shows through.

Next

FIG.8

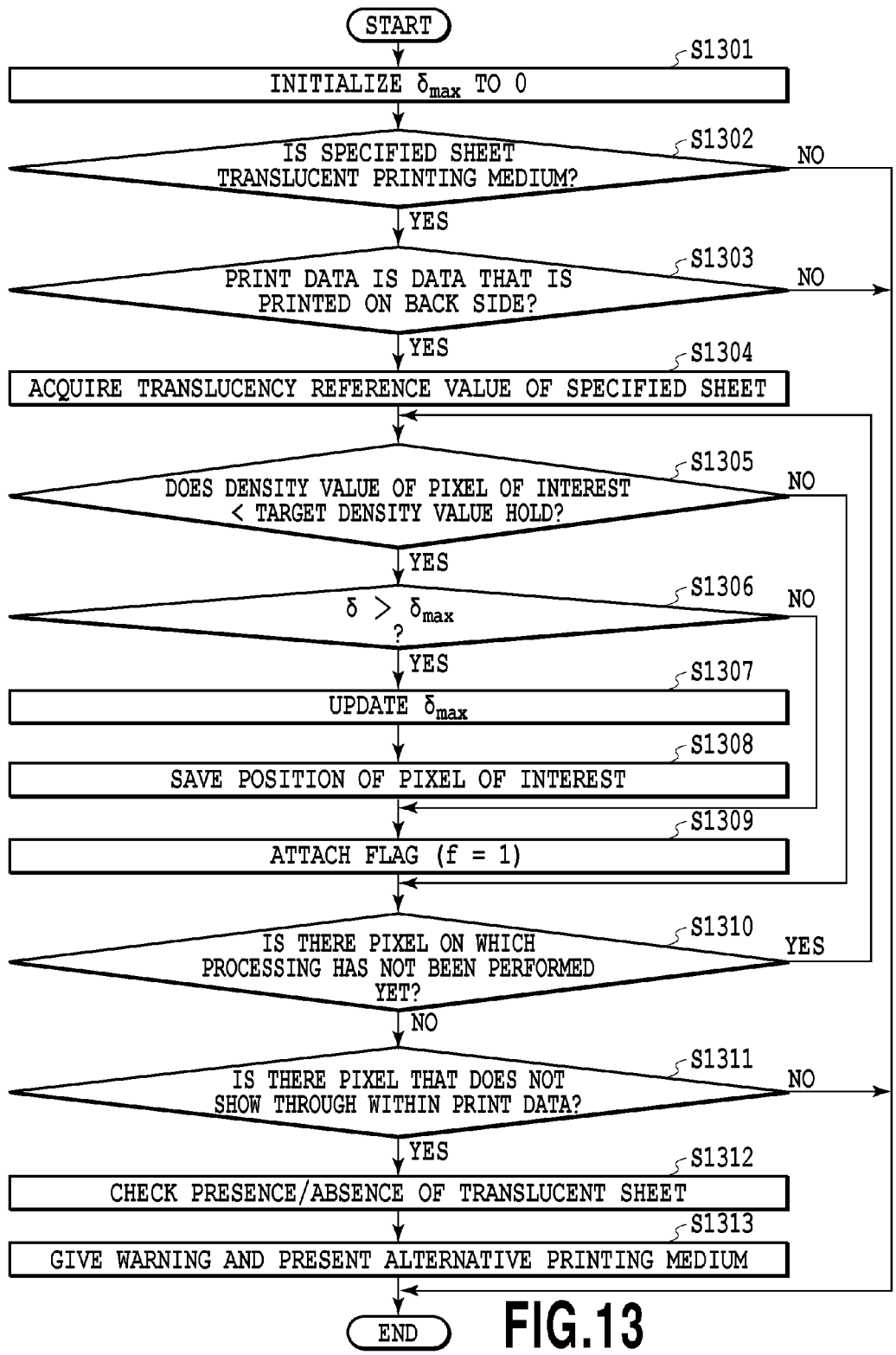

IMAGE PROCESSING APPARATUS, METHOD, AND PROGRAM PRODUCT DETERMINING SHOW-THROUGH OF IMAGE FORMED ON TRANSLUCENT PRINT MEDIUM

BACKGROUND OF THE INVENTION

1. Field of the Invention

The present invention relates to formation of an image on a translucent sheet.

2. Description of the Related Art

In recent years, an image forming apparatus called an MFP (Multi Function Printer) including the functions as a printer, a scanner, a facsimile, etc., is widely used. Constructing an image forming system in which a so-called printing control apparatus is connected to such an image forming apparatus is also performed widely. The printing control apparatus is an apparatus that performs various kinds of image processing related to print job processing, performs various kinds of setting processing for the image forming apparatus, and gives instructions to perform printing, and is also called a DFE (Digital Front End).

The purpose of connecting the DEF to the MFP is to improve the functions that are provided by the MFP and to provide the functions unique to the DFE. An example of improvement in function is to improve the processing performance of a print job. By causing the DFE to interpret the page description language (PDL) and to generate bitmap data, and by causing the MFP to perform processing to print the generated bitmap data, it is possible to efficiently perform print job processing in a brief time compared to the case where the MFP alone performs all the processing. The functions unique to the DFE include page edition and imposition of a print job, image processing setting, image forming processing in accordance with the kind of a sheet on which printing is performed, etc. There are miscellaneous kinds of printing sheets on which an image can be formed by the MFP, including not only the copy sheet (plain sheet) but also the coated sheet, the label sheet, and the index sheet. Such a special sheet is used in order to add a value to a printed product. The DFE and the MFP collaborate in changing parameters of image processing in accordance with the kind of a printing sheet, in changing the layout of an image, etc.

Some of the printing sheets have a tendency to cause a large amount of light to pass through and characteristics that an image printed on the back side or an image printed on the next page shows through. An example of such a printing sheet is an OHP film, a polypropylene film, or tracing paper. Such a sheet causes light to penetrate therethrough by selecting a material and reducing the thickness of the sheet. The degree of transparency differs from sheet to sheet and there is a sheet whose degree of transparency is high and the back side shows through as it is or a semitransparent sheet whose degree of transparency is reduced and which shows a unique feeling when an image on the back side is seen through. In the present specification, the printing sheet having optical translucency is called a translucent printing medium. In the case where an image is formed on a translucent printing medium, an image that is printed on the back side or on the next page shows through, and therefore, various image forming methods in accordance with purposes have been proposed. In particular, because an image that is printed on the back side can be seen from the front side, there exists a technique to improve quality of a printed product by performing mirror-image conversion on all or part of the image data to be printed on a translucent printing medium and performing printing on the back side.

For example, Japanese Patent Laid-Open No. 2011-112681 has described an image forming method that is effective in the case where the back side of printed matter obtained by using a translucent printing medium is irradiated with light from a light source for an advertisement use. The technique described in Japanese Patent Laid-Open No. 2011-112681 is a technique to extract only the high-density portions of the front side image and to print the extracted image also from the back side after performing mirror-image conversion on the extracted image in order to keep the gradation properties at low densities while maintaining the high density of the image that is formed.

However, the technique described in Patent document 1 premises that an image that is printed on the back side shows through, but whether the image that is printed on the back side actually shows through the front side is not determined. The translucent printing media are manufactured by many makers and the number of the kinds of the translucent printing media is large. Further, whether or not an image shows through a translucent printing medium depends also on the image forming apparatus that is used and the density of the color material. Furthermore, the determination of whether or not an image shows through may differ depending on the viewpoint of a user. Because of this, it is necessary for a user to check how an image shows through by actually performing trial printing and to repeatedly perform trial printing until an expected printed product is obtained (until an image shows through as expected).

SUMMARY OF THE INVENTION

The image processing apparatus according to the present invention includes a unit configured to acquire a translucency reference value indicating the degree of optical translucency in a specified translucent printing medium, a show-through determination unit configured to determine whether there exists a difference between the density of a pixel in print data and the density specified by the acquired translucency reference value and whether the density of the pixel in the print data is lower than the density specified by the translucency reference value, and a first determination unit configured to determine whether or not a user should be notified of information on whether an image that is formed on the translucent printing medium in accordance with the print data shows through in accordance with the results of the determination by the show-through determination unit.

According to the present invention, it is possible for a user to grasp a degree in which an image that is printed on the back side of a translucent printing medium shows through the front side before performing printing.

Further features of the present invention will become apparent from the following description of exemplary embodiments (with reference to the attached drawings).

BRIEF DESCRIPTION OF THE DRAWINGS

FIG. 6A is an example of the UI screen that is displayed in the case where the selected sheet is a translucent printing medium and FIG. 6B is an example of the UI screen that is displayed in the case where the selected sheet is a sheet other than a translucent printing medium;

FIG. 7A shows the back side thereof and FIG. 7B shows the front side thereof, respectively;

FIG. 8 is a diagram showing an example of a message screen to prompt registration of a translucency reference value;

FIG. 13 is a flowchart showing a flow of show-through determination processing in preflight processing according to a third embodiment.

DESCRIPTION OF THE EMBODIMENTS

Hereinafter, embodiments for embodying the present invention are explained by using the drawings. Configurations shown in the following embodiments are just an example and the present invention is not limited to the configurations shown schematically.

First Embodiment

Figure 1:
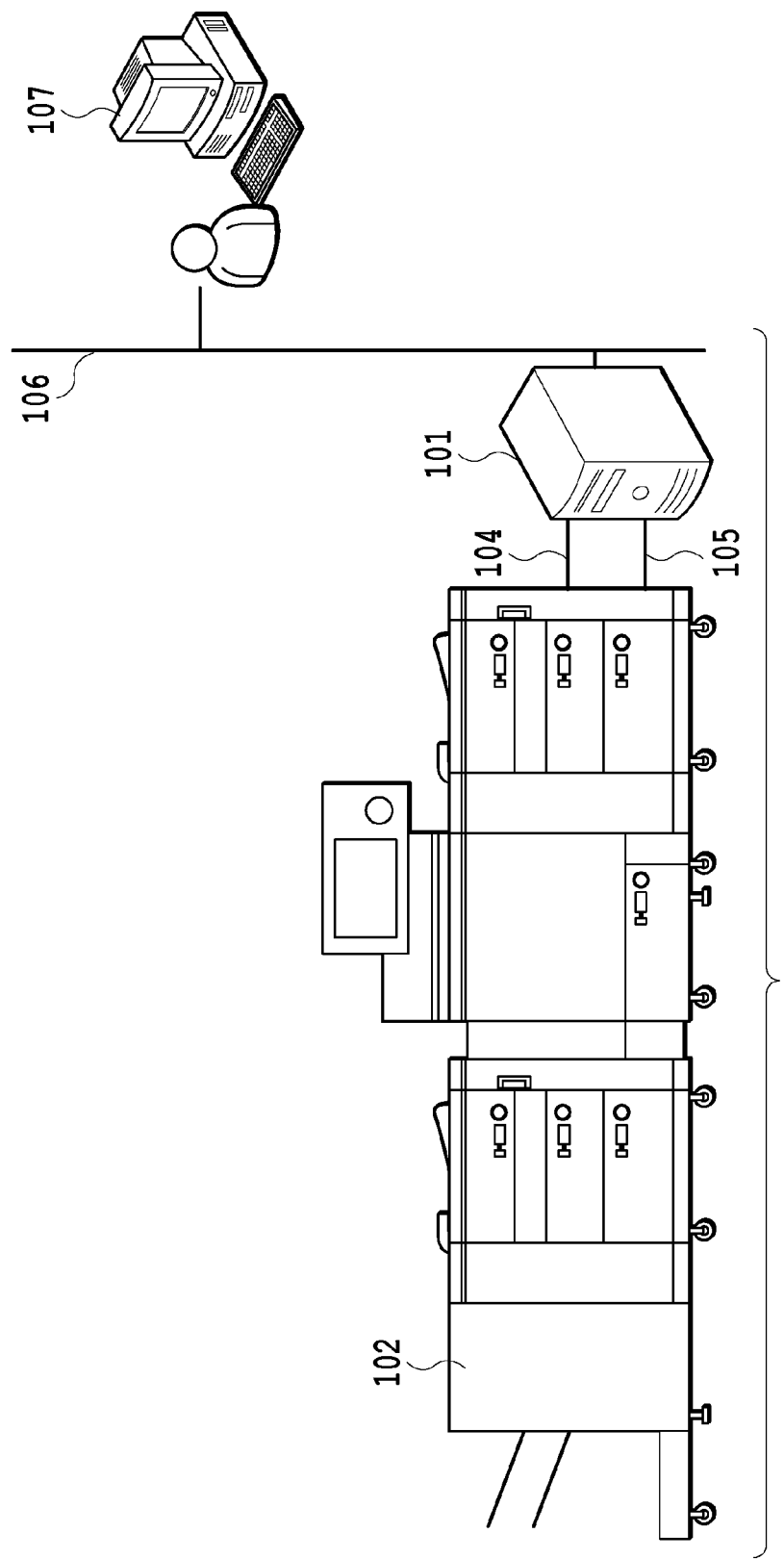
FIG. 1 is a diagram showing a configuration example of an image forming system.

FIG. 1 is a diagram showing a configuration example of an image forming system. An image forming system 100 includes a printing control apparatus 101 and an image forming apparatus 102 and is connected with a client terminal 107 via a network 106 such as a LAN. A plurality of client terminals 107 may exist on the network 106.

Figure 2:
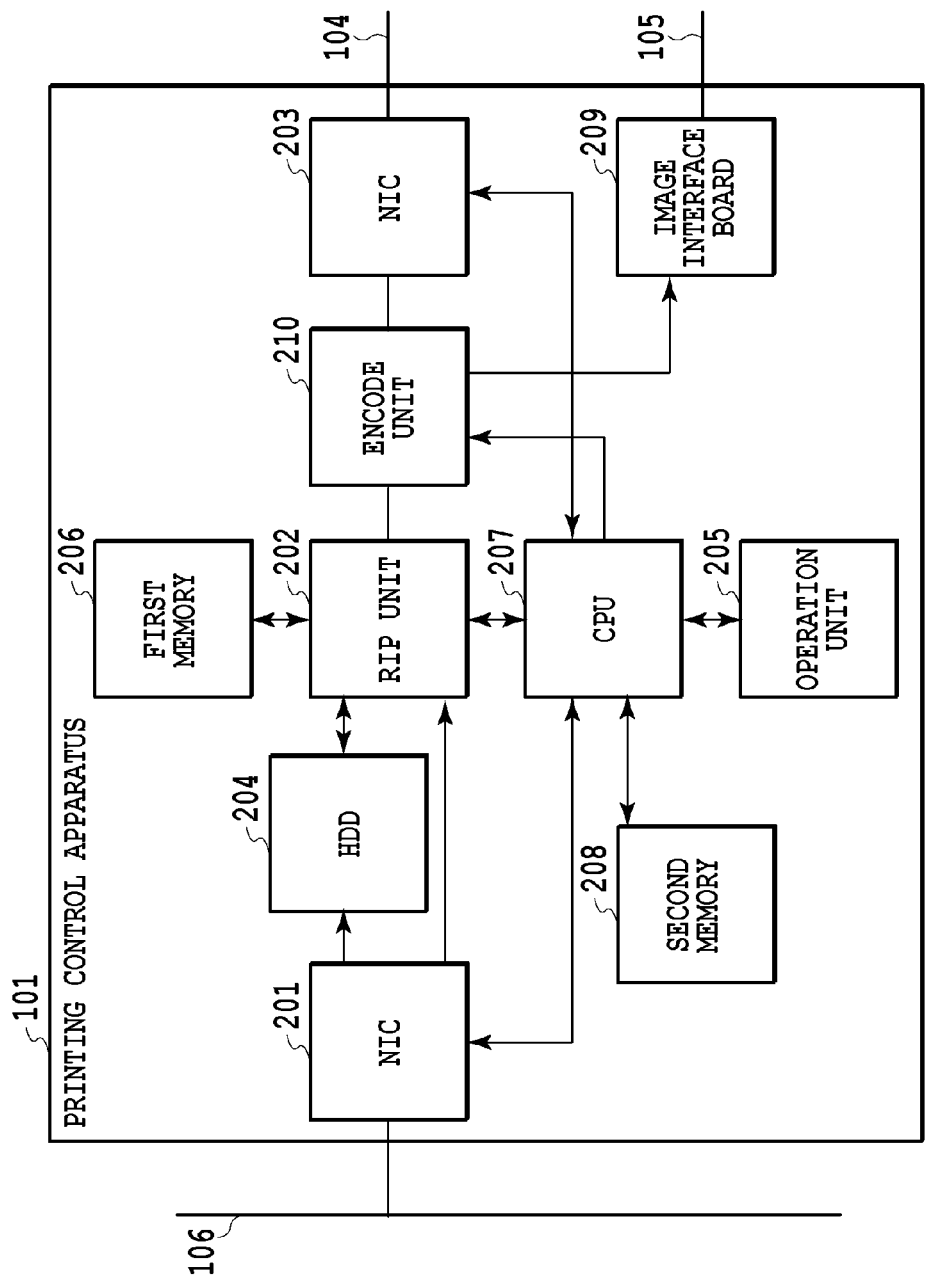
FIG. 2 is a diagram showing an internal configuration of a printing control apparatus.

FIG. 2 is a diagram showing an internal configuration of the printing control apparatus 101.

An NIC (Network Interface Card) 201 is a first network interface that controls the connection with the network 106 at a low level.

An RIP (Raster Image Processor) unit 202 converts data described in the page description language (PDL) into a raster image such as a bitmap image.

An NIC 203 is a second network interface that controls the connection with a transfer path 104 at a low level layer.

An HDD 204 is a hard disk drive for temporarily saving print data etc., received through the NIC 201. It is possible for the HDD 204 to store various kinds of setting information that is managed by the printing control apparatus 101. It is possible for the printing control apparatus 101 to read and use the setting information from the HDD 204 in accordance with necessity and to write a change in the setting information requested from the outside or through an operation unit 205 to the HDD 204.

A first memory 206 includes a storage unit (RAM) used by the RIP unit 202 in image development processing.

A CPU 207 is a processor that controls the entire printing control apparatus 101.

A second memory 208 is a storage unit (RAM) used by the CPU 7 as a data temporary saving area.

The operation unit 205 includes buttons, a keyboard, a touch panel, etc., and a user gives instructions to perform various operations to the printing control apparatus 101 using these components.

An image interface board 209 is an interface for forming and transferring image data. The dedicated transfer path 104 and a dedicated transfer path 105 are formed by using the above-described NIC 203 and the image interface board 209, and thereby image data is transferred to the image forming apparatus 102.

The above is an outline of the printing control apparatus 101.

Figure 3:
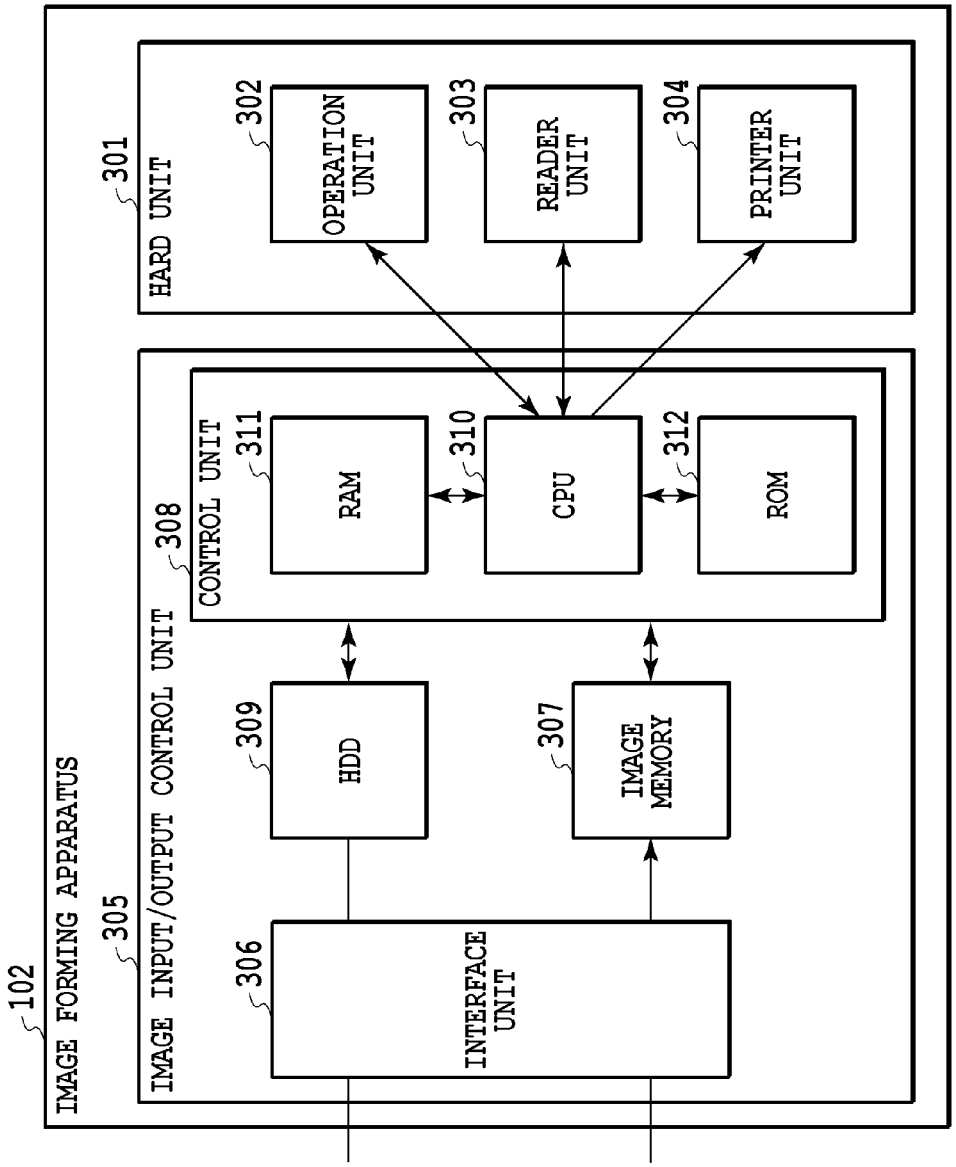
FIG. 3 is a diagram showing an internal configuration of an image forming apparatus.

FIG. 3 is a diagram showing an internal configuration of the image forming apparatus 102. The image forming apparatus 102 includes a hard unit 301 and an image input/output control unit 305. First, the hard unit 301 is explained.

The hard unit 301 includes an operation unit 302, a reader unit 303, and a printer unit 304.

The operation unit 302 includes a touch panel etc. and a user gives instructions to perform various operations to the image forming apparatus 102 101 using the touch panel.

The reader unit 303 reads a document set on a document table etc., not shown, and generates image data. The generated image data is sent to the image input/output control unit 305.

The printer unit 304 forms and outputs an image in accordance with image data received from the image input/output control unit 305 on a sheet. Here, explanation is given on the assumption that the image printing system of the image forming apparatus 102 is the electrophotographic system that uses toner as a color material. However, the system is not limited to this and another system, for example, such as the ink jet system may be accepted.

Next, the image input/output control unit 305 is explained. The image input/output control unit 305 is connected with the above-described hard unit 301 and includes an interface unit 306, an image memory 307, a control unit 308, and a hard disk (HDD) 309.

The interface unit 306 is an interface between the printing control apparatus 101 and the control unit 308, and between the client terminal 107 on the network 106 and the control unit 308. The interface unit 306 receives image data on which encode processing has been performed by the printing control apparatus 101, develops the received image data into image data that can be used by the printer unit 304, and delivers the image data to the control unit 308.

The control unit 308 includes a CPU 310, a RAM 311, and a ROM 312. The CPU 310 reads programs stored in the ROM 312 onto the RAM 311 and executes the programs, and thus controls a flow of data between each unit, such as the reader unit 303, the interface unit 306, and the image memory 307.

In the HDD 309, data related to various kinds of settings of the image forming apparatus 102, such as an address book, an operation history, user settings, ID settings, and network settings, is saved. It may also be possible to provide a nonvolatile memory, the data of which is not erased even in the case where the power source is turned off, in place of the HDD 309 and to save the data therein.

The above is an outline of the image forming apparatus 102.

Next, printing processing of a print job that is input from the client terminal 107, which is the basic operation of the image forming system 100, is explained.

First, a print job is input to the printing control apparatus 101 from the client terminal 107 via the network 106. Inside the printing control apparatus 101, processing to receive data is performed by the NIC 201.

Upon receipt of the print job, the CPU 207 writes the print job to the HDD 204 in accordance with necessity. The print job stored in the HDD 204 is sent to the RIP unit 202 by instructions from the CPU 207.

The RIP unit 202 interprets the PDL included in the print job, performs processing to form a rasterized image, and generates raster mage data. The generated raster image data is sent to the encode unit 210.

The encode unit 210 performs processing to encode the raster image data into a predetermined data format that the image forming apparatus 102 can interpret. An example of encode processing is data compression processing to reduce the amount of data that is transmitted to the image forming apparatus 102. The encode processing such as this is performed in accordance with necessity, and therefore, it may also be possible to skip the encode processing in the case where the encode processing is not necessary, such as the case where the image forming apparatus 102 can interpret the raster image or the case where it is not necessary to reduce the amount of data. The data after the encode processing needs to have a format that the image forming apparatus 102 can interpret. The format may be, for example, a specific print language format or a data format the data of which is compressed by a specific method, such as JBIG, depending on the capacity of the interpretation unit possessed by the image forming apparatus 102.

The data on which the encode processing has been performed in accordance with necessity is turned into a data packet again in the NIC 203 and is sent to the image forming apparatus 102 via the transfer path 104. The transfer path of data on which encode processing has been performed includes a path that uses the transfer path 105 via the image interface board 209.

The image forming apparatus 102 having received the data packet feeds a sheet from a sheet feeder unit (not shown) and performs printing processing in accordance with a printing processing procedure possessed by the image forming apparatus 102 itself.

In the manner as described above, the print job input from the client terminal 107 is subjected to the processing in the image forming system 100.

Next, processing to register a translucency reference value for each translucent printing medium is explained. Here, it is assumed that the translucency reference value is an index indicating the optical translucency in a translucent printing medium and also indicating a value that serves as a reference based on which whether a color material printed on the back side shows through the front side is determined.

The image forming system 100 according to the present embodiment holds in advance the printing setting (hereinafter, the sheet setting) indicating the features of sheets that are used by the printing control apparatus 101 at the time of RIP or that are set to the image forming apparatus 102 at the time of printing. A user implements printing by allocating the sheet setting held by the image forming system 103 to the sheet placed in the feeder cassette of the image forming apparatus 102 and by setting the same sheet setting to the print job. The sheet setting is managed by the CPU 207 and the CPU 310 while the printing control apparatus 101 and the image forming apparatus 102 are collaborating with each other. The contents of the sheet setting that is set via the operation unit 205 of the printing control apparatus 101 can be edited by the operation unit 302 of the image forming apparatus 102, and the contents of the sheet setting that is set via the operation unit 302 of the image forming apparatus 102 can also be edited by the operation unit 205 of the printing control apparatus 101. The sheet setting is saved in the HDD 204 of the printing control apparatus 101 and in the HDD 309 of the image forming apparatus 102, respectively. In the present embodiment, it is assumed that the translucency reference value is registered as one of setting items in the sheet setting.

Figure 4:
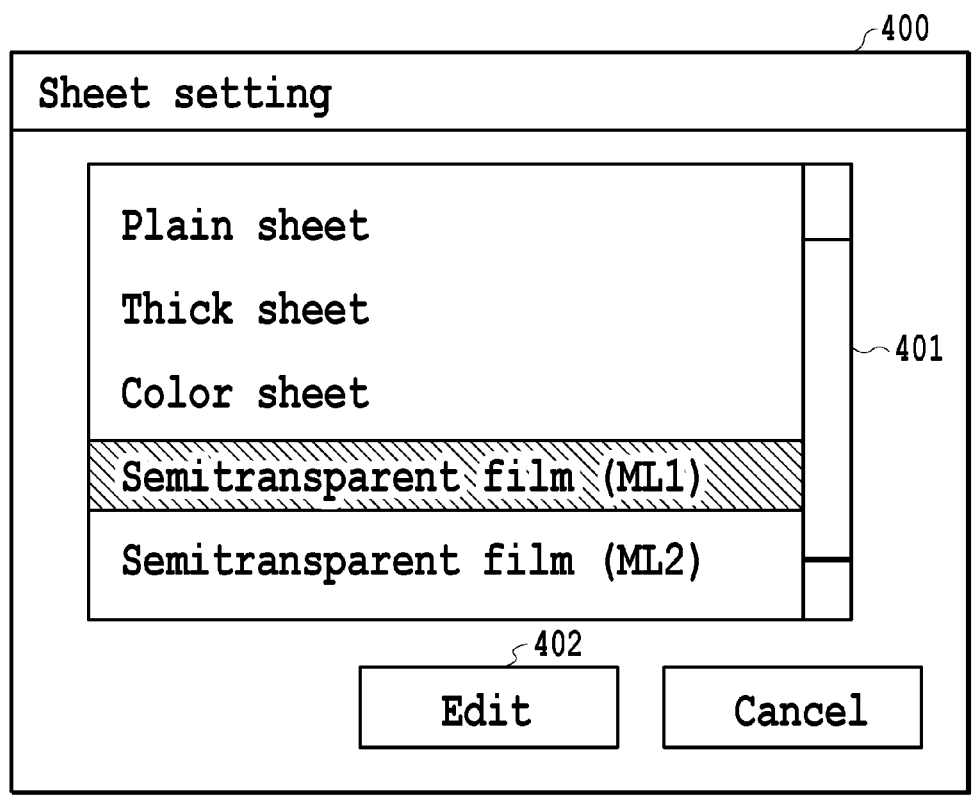
FIG. 4 is a diagram showing an example of a sheet setting UI screen.

FIG. 4 is a diagram showing an example of a sheet setting UI screen that is displayed on the operation unit 302 of the image forming apparatus 102. In a list box 401 within a sheet setting UI screen 400, all the sheets that are used by the printing control apparatus 101 and the image forming apparatus 102 are displayed in a list. In other words, all the sheets that are used by the copy function, such as the plain sheet and thick sheet, other than the translucent printing medium are also registered and displayed in a list. A user selects one of the sheets from the list box 401 and customizes a variety of setting items for each sheet by pressing down an Edit button 402. Then, the user allocates the sheet setting in accordance with the sheet placed in the feeder unit of the image forming apparatus 102 to the feeder unit before performing printing, then, performs printing.

Figure 5:
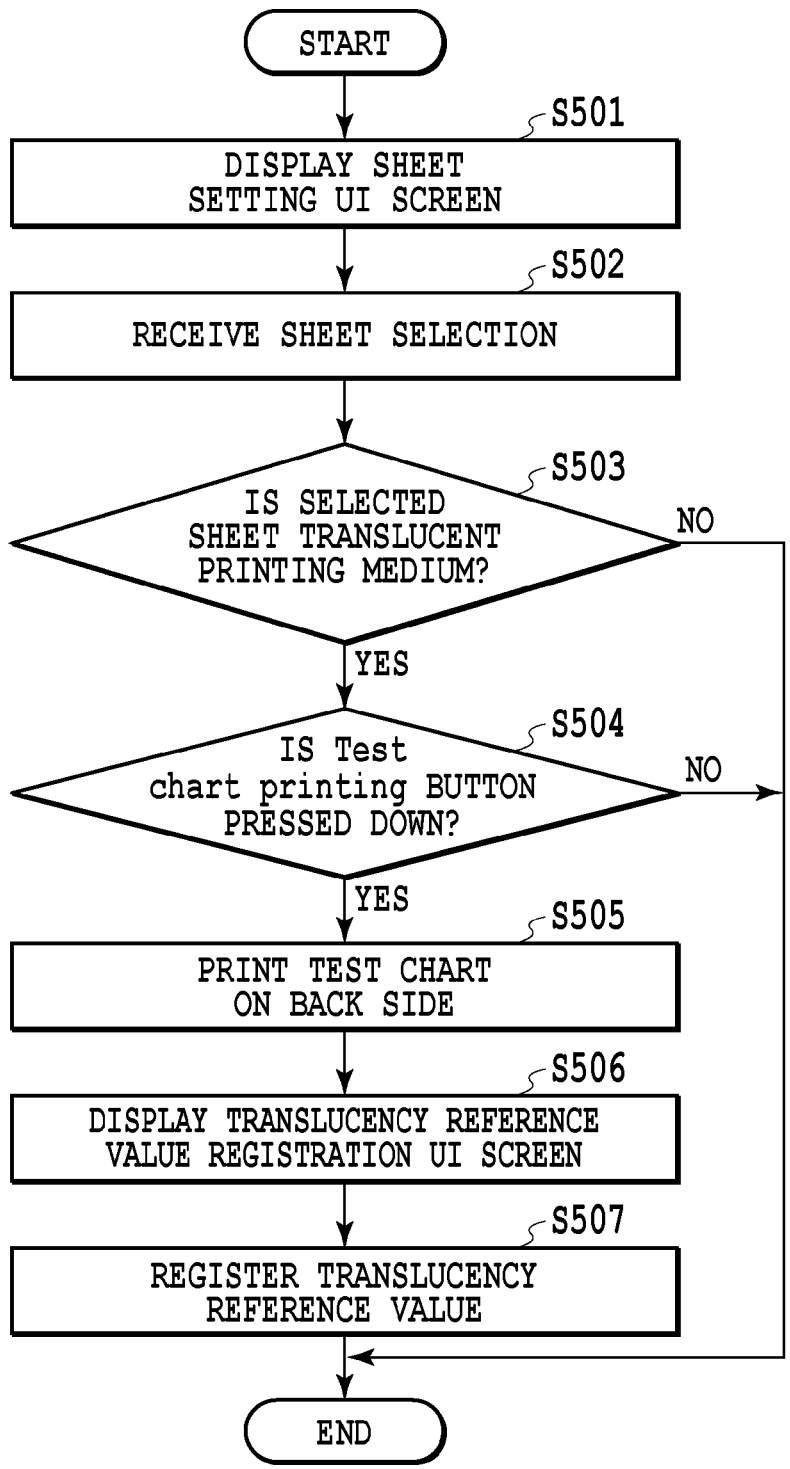
FIG. 5 is a flowchart showing a flow of processing at the time of registering a translucency reference value.

FIG. 5 is a flowchart showing a flow of processing at the time of registering a translucency reference value. The series of processing is performed by the CPU 310 reading computer executable programs in which the procedures shown below are described from the ROM 312 onto the RAM 311 and executing the programs.

In response to the operation instructions from a user, the control unit 308 displays the sheet setting UI screen 400 on the operation unit 302 at step 501. The user selects a translucent printing medium that is used in printing from the list box 401 of the sheet setting UI screen 400 and presses down the Edit button 402. Here, it is assumed that Semitransparent film (ML1) is set in the print job and the user has selected Semitransparent film (ML1) (Semitransparent film (ML1) is highlighted on the sheet setting UI screen 400 in FIG. 4).

At step 502, the control unit 308 receives sheet selection by the user (here, Semitransparent film (ML1)).

At step 503, the control unit 308 determines whether or not the sheet that has been selected by the user is a translucent printing medium and displays a detailed setting UI screen corresponding to the selected sheet on the operation unit 302. FIGS. 6A and 6B are diagrams showing examples of the detailed setting UI screen. FIG. 6A is an example of the UI screen that is displayed in the case where the selected sheet is a translucent printing medium and FIG. 6B is an example of the UI screen that is displayed in the case where the selected sheet is a sheet other than a translucent printing medium. In the case where Semitransparent film (ML1) is selected, the detailed setting UI screen in FIG. 6A is displayed as a result. On the detailed setting UI screen, it is possible to set characteristics that are different from sheet to sheet, such as the basis weight, the surface properties, and the amount of curl correction (correction to restore a sheet that is bent due to heat at the time of fixing to the original straight sheet). Then, registration of the translucency reference value for each translucent printing medium is also performed from the detailed setting UI screen. "Expected blurring ratio" of the setting items listed in FIGS. 6A and 6B are explained in a second embodiment. On the detailed setting UI screen shown in FIG. 6A that is displayed in the case where the selected sheet is a translucent printing medium, a Test chart printing button to the right of the setting item "Translucency reference value" is displayed in the state where the button can be pressed down. On the other hand, in the case where the selected sheet is not a translucent printing medium, the Test chart printing button is displayed in the state where the button cannot be pressed down (e.g., in the grayed-out state, see FIG. 6B) and the present processing is exited.

In the case where a user presses down one of the buttons, the control unit 308 determines which button has been pressed down at step 504. In the case where the button that has been pressed down is the Test chart printing button, the processing proceeds to step 505. On the other hand, in the case where the button that has been pressed down is a button other than the Test chart printing button, the present processing is exited in order to perform processing in accordance with the button that has been pressed down.

Figure 7A:
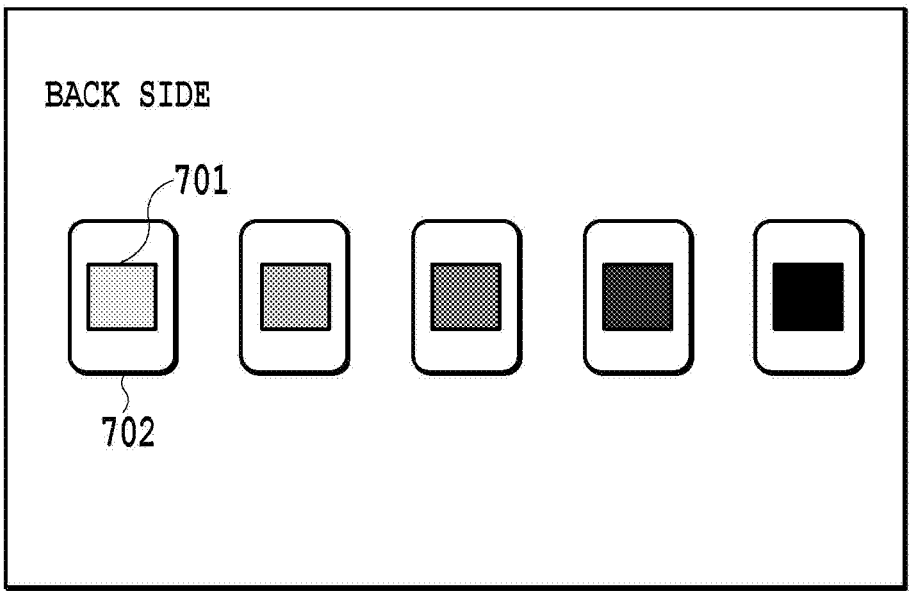
FIGS. 7A and 7B are diagrams showing examples of a test chart that is printed and output.
Figure 7B:
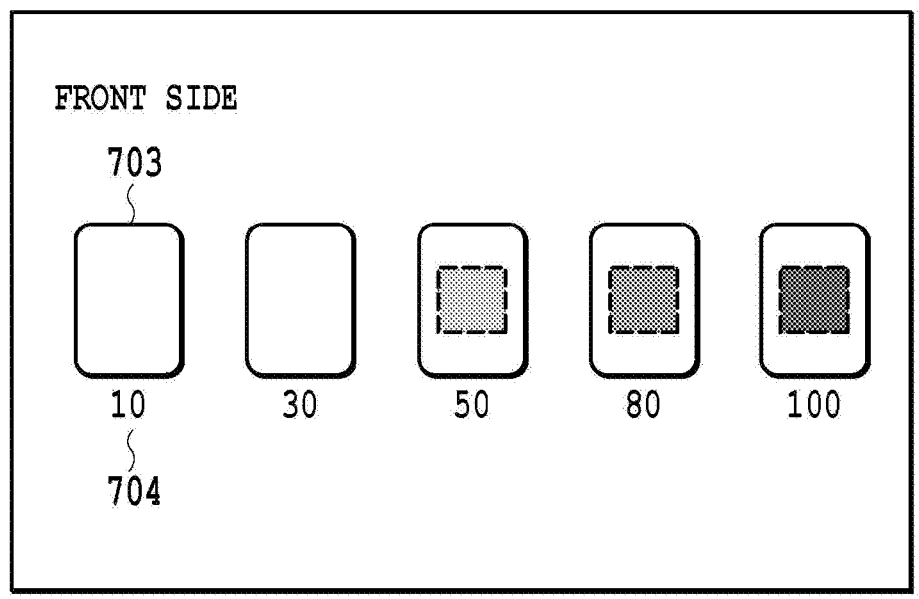

As step 505, the control unit 308 gives instructions to print a test chart to the printer unit 304. FIGS. 7A and 7B are diagrams showing examples of a test chart that is printed and output. FIG. 7A shows the back side thereof and FIG. 7B shows the front side thereof, respectively. On the back side of the test chart, for a certain color (here, Black: K), a patch 701 is arranged within a frame 702 and the five patches 701 are put side by side in order so that the printing density increases from the leftmost patch 701. On the front side of the test chart, a frame 703 corresponding to the frame 702 and a density (%) 704 corresponding to the patch printed on the back side are printed, respectively, for the five frames 702. Then, a user observes the front side (FIG. 7B) of the output test chart and checks which patch shows through. As described above, on the test chart, the position of the patch 701 printed on the back side is adjusted so as to be included in the frame 703 on the front side and the density (%) 704 of the corresponding patch is printed around the frame 703 on the front side, and therefore, it is possible for a user to easily check how each patch shows through.

FIG. 8 is a diagram showing an example of a message screen for prompting registration of a translucency reference value based on the output test chart, which is displayed on the operation unit 303 at the time of test chart printing. A user checks the lowest density (%) at which the patch on the back side shows through in the output test chart.

Figure 9:
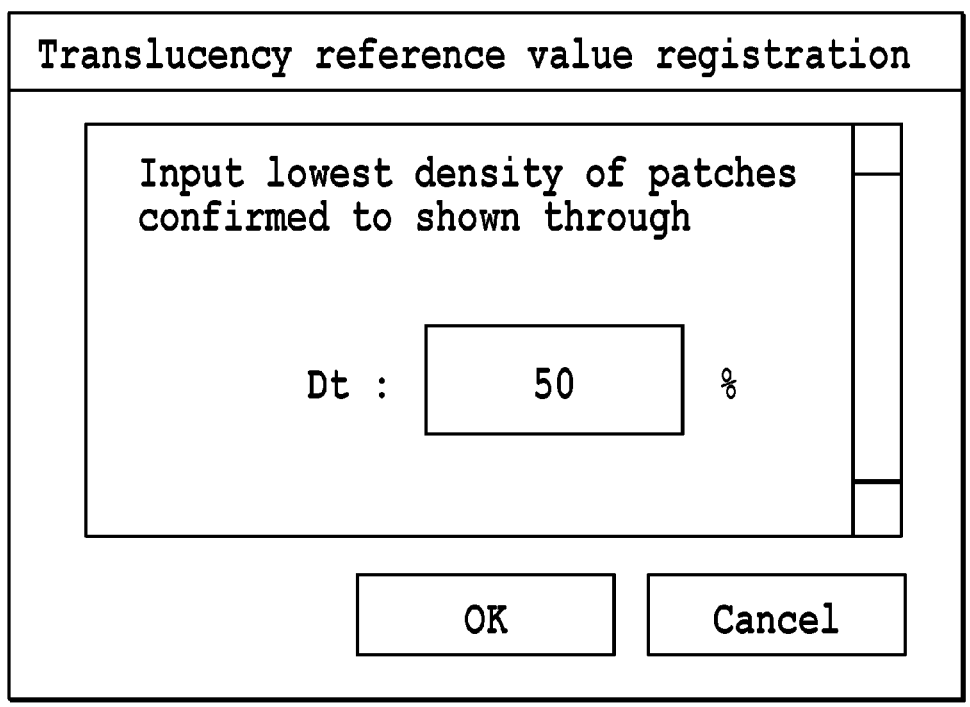
FIG. 9 is an example of a translucency reference value registration UI screen.

At step 506, the control unit 308 causes the operation unit 302 to display a translucency reference value registration UI screen. FIG. 9 is an example of the translucency reference value registration UI screen. The user inputs the value of the lowest density (%) of the patches that have been determined to show through by the user via the UI screen such as this as a translucency reference value of a translucent printing medium that is used. In the case of Semitransparent film (ML1) shown in the example in FIGS. 7A and 7B described previously, the show-through can be checked at a density of 50% or higher, and therefore, the user inputs "50" as the translucency reference value. Then, by the user pressing down the OK button, the UI screen is exited and at the same time, the input value is registered as the translucency reference value in the sheet setting.

The above is the contents of the processing to register the translucency reference value in the sheet setting. In the present embodiment, registration in the case of the single color (Black: K) is explained, but it may also be possible to print a test chart on which, for example, patches are printed in each color of Cyan: C, Magenta: M, Yellow: Y, and Black: K or a test chart on which patches are printed in two or more colors, and to set the translucency reference value for each color of the color material. Due to this, it is made possible to reflect the user' preference for a color more exactly.

Next, checking of the degree of show-through at the time of preflight processing is explained. Here, the preflight refers to a function to check the state of an image related to print data for printing (whether there is no problem in print data and printing can be performed) before printing is performed and to give a warning to a user in the case where there is a problem. In general, the preflight processing is performed by a job management application in the printing control apparatus 101. Then, it is possible to check the results of the preflight processing on, for example, a preview display of the image data on which processing has been performed by the RIP unit 202 and in the case where the print job is such that, for example, printing is performed in an area other than the specified printing area, a warning to that effect is given. By using the preflight function, it is possible for a user to grasp, for example, the printing in an area other than the printing area as described above, and therefore, to avoid wasteful printing from being performed. In the present embodiment, it is assumed that show-through determination in accordance with a sheet to be used is performed in the preflight processing of the print job that uses a translucent printing medium.

Figure 10:
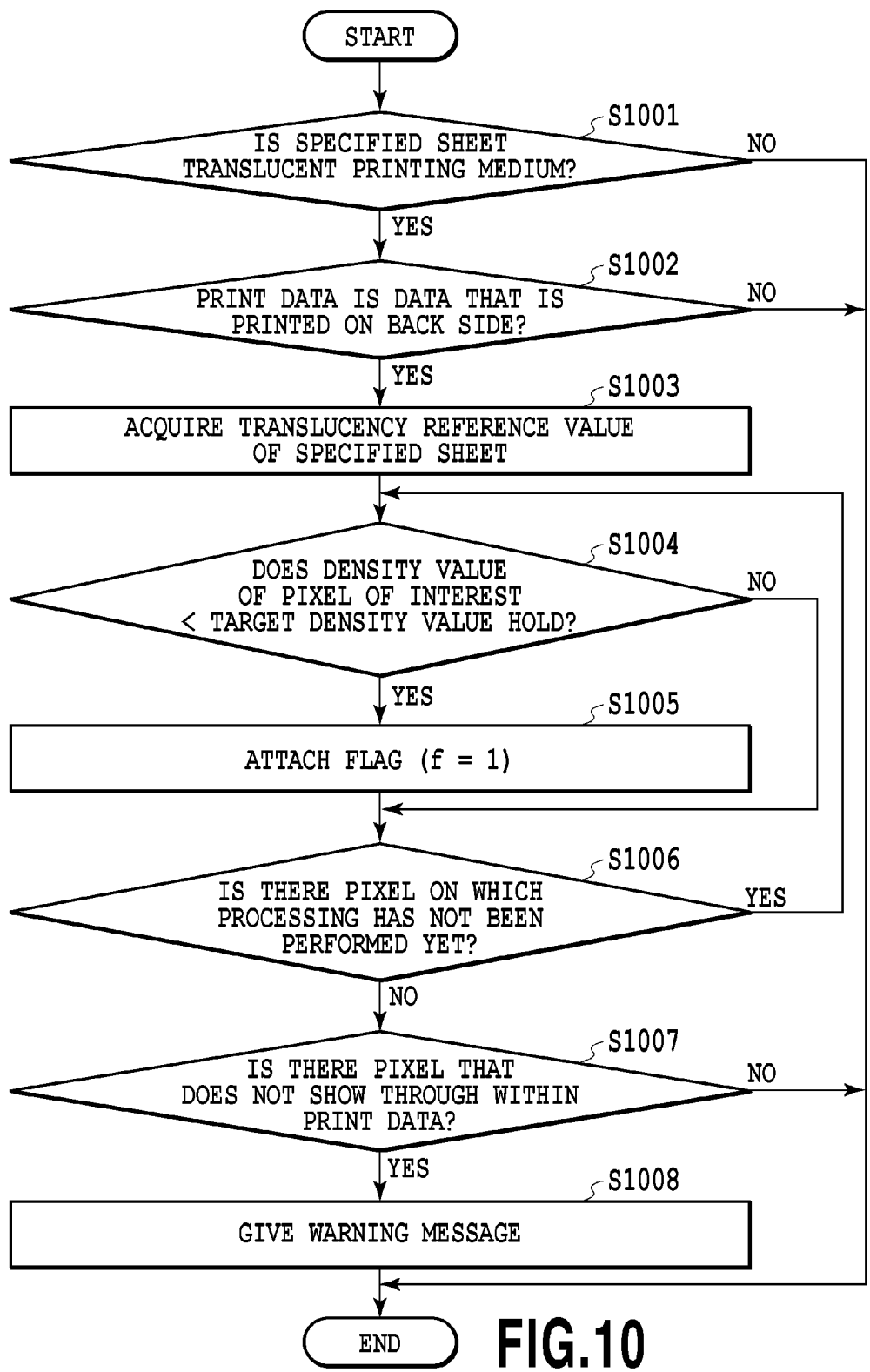
FIG. 10 is a flowchart showing a flow of show-through determination processing in preflight processing according to a first embodiment.

FIG. 10 is a flowchart showing a flow of show-through determination processing in the preflight processing according to the present embodiment. The series of processing is performed by the CPU 207 reading computer executable programs in which procedures shown below are described from the HDD 204 onto the second memory 208 and executing the programs.

Upon receipt of instructions to perform the preflight processing from a user, the CPU 207 determines whether or not the sheet specified in the print job that has been input is a translucent printing medium at step 1001. In the case where the sheet specified in the print job is a translucent printing medium, the processing proceeds to step 1002. On the other hand, in the case where the sheet specified in the print job is not a translucent printing medium, the present processing is exited.

At step 1002, the CPU 207 determines whether the print data within the print job is data that is printed on the back side and at the same time, which is supposed to be seen from the front side. In the setting of the print job, there exists an item by which it is possible to specify a printing side for each object of an image. Consequently, for example, whether the back side is specified as the printing side of the print data within the print job is determined at this step. In the case where the print data is determined to be the data that is printed on the back side, the processing proceeds to step 1003. On the other hand, in the case where the print data is determined to be the data that is not printed on the back side, the present processing is exited. In addition to, or in place of the determination of whether the print data is the image data that is printed on the back side, it may also be possible to determine whether the print data is the data (object) that is specified to be subjected to mirror-image printing.

At step 1003, the CPU 207 acquires the translucency reference value of a sheet that is specified in the print job by referring to the previously-described sheet setting that is saved in the HDD 204. For example, in the case where Semitransparent film (ML1) shown in FIGS. 7A and 7B are the sheet specified in the print job, a value of "50(%)" is acquired as a translucency reference value (Dt). At step 1004, the CPU 207 determines whether each pixel of the rasterized image data on which the processing has been performed by the RIP unit 202 can be visually recognized from the front side with no problem (whether the pixel shows through) in the case where printing is performed on the back side of the sheet. Specifically, the condition determination is performed from the first pixel in order by using expression (1) below.

$$\delta = \sqrt{(D_t - C_i)^2 + (D_t - M_i)^2 + (D_t - Y_i)^2 + (D_t - K_i)^2} \qquad \text{expression (1)}$$

In the above-described expression (1), Ci indicates the value of Cyan of each pixel of the print data, Mi indicates the value of Magenta of each pixel of the print data, Yi indicates the value of Yellow of each pixel of the print data, and Ki indicates the value of Black of each pixel of the print data. Then, Dt in the above-described expression (1) is the density value (target density value) that is specified by the translucency reference value acquired at step 1003. For example, in the case where the density value of each pixel is represented by one of values of 0 to 255, on a condition that the translucency reference value acquired at step 1003 is "50(%)", Dt in the above-described expression (1) takes "128" as the target density value.

In the above-described expression (1), the sum of distances between the Lab value corresponding to the target density value and the Lab value corresponding to each color of each pixel on the Lab space is found. In other words, the sum of the distance between Dt and the Lab value of Cyan of each pixel of the print data, the distance between Dt and the Lab value of Magenta of each pixel of the print data, the distance between Dt and the Lab value of Yellow of each pixel of the print data, and the distance between Dt and the Lab value of Black of each pixel of the print data is found. In the present embodiment, in the case where there exists a difference (δ) between the density value in the pixel of interest and the target density value and the density value of the pixel of interest is lower than the target density value, it is determined that the possibility that the pixel is a pixel that cannot be recognized visually from the front side of the sheet (that the pixel is a pixel that does not show through) is great. In other words, in the case where δ>0, Dt>Ci, Dt>Mi, Dt>Yi, and Dt>K, the pixel of interest is determined to be a pixel that does not show through.

At step 1005, the CPU 207 sets a flag indicating that the pixel is a pixel that does not show through to the pixel of interest determined to be a pixel that dose not show through. Specifically, a flag "1" is set to the portion of the pixel of interest of a flag file (the same size as the total number of pixels of the rasterized image data) secured in the HDD 204.

At step 1006, the CPU 207 determines whether the processing has been completed for all the pixels within the print data. In the case where there is a pixel on which the processing has not been performed yet, the processing returns to step 1004 and the processing is continued for the next pixel of interest. On the other hand, in the case where the processing has been completed for all the pixels, the processing proceeds to step 1007.

At step 1007, the CPU 207 determines whether the pixel determined to be a pixel that does not show through exists in the print data to be subjected to the preflight (whether the pixel whose flag value is 1 exists). The results of the determination indicate that a pixel that does not show through exists, the processing proceeds to step 1008. On the other hand, in the case where a pixel that does not show through does not exist, the present processing is exited. Here, the processing proceeds to step 1008 in the case where there is one and only one pixel that does not show through, but it may also be possible to design the flowchart so that the processing proceeds to step 1008 in the case where the number of pixels that do not show through exceeds a predetermined threshold value (e.g., 5).

At step 1008, the CPU 207 notifies (warns) a user of that there is a possibility that an object that is expected to show through and can be seen from the front side of the sheet cannot be recognized visually in the case where printing is performed in this state by, for example, displaying a message to that effect on the screen of the operation unit 205. A warning may be given vocally in place of or together with the message display.

The above is the contents of the preflight processing according to the present embodiment.

In the present embodiment, explanation is given by using the case of the image forming system including the printing control apparatus and the image forming apparatus as an example, but it is also possible to apply the present embodiment to an image forming apparatus that also has the function of the printing control apparatus.

As described above, according to the present embodiment, whether an image (object) that is printed on the back side of a sheet can be visually recognized from the front side is determined based on the translucency reference value that is registered for each sheet and a warning is given to a user in accordance with necessity. Due to this, it is possible for a user to grasp whether an image that is printed on the back side shows through the front side before performing printing on a translucent printing medium.

Second Embodiment

In the case where an image is printed on the back side of a semitransparent sheet whose transparency is low and on which the color of a material is left and the image is caused to be seen from the front side, the image is seen in the state where the color of the sheet material is added to the color of the printed image itself, and therefore, the blurring effect is given to the image that shows through. By the determination alone of whether an image that is printed on the back side of a sheet shows through the front side based on the translucency reference value registered in advance as described in the first embodiment, it is not possible to grasp a degree in which the image is blurred in the case where the image is seen.

Because of this, an aspect is explained as a second embodiment, in which a degree in which an image that is printed on the back side of a sheet is blurred in the case where the image is seen from the front side is derived and whether a blurring ratio that is expected (expected blurring ratio: R) can be obtained is determined.

Explanation of the portions in common to those of the first embodiment is omitted or simplified and in the following, different points are explained mainly.

In the case of the present embodiment, a user registers the expected blurring ratio in addition to the translucency reference value in the translucency reference value registration processing (in the flowchart in FIG. 5) described in the first embodiment. The previously-described translucency reference value specifies the lowest density at which a color material printed on the back side of a sheet shows through and is seen from the front side and a user performs determination based on the printing results of the test chart and registers a value corresponding to the lowest density at which it is confirmed that the color material shows through. In contrast to this, the expected blurring ratio (R) indicates a degree that is desired by a user in which an image that is printed on the back side of a sheet is seen from the front side. Here, the expected blurring ratio (R) indicates that an image printed on the back side shows through perfectly and is seen as it is in the case where the expected blurring ratio is 100%, and that an image printed on the back side does not show through at all in the case where the expected blurring ratio is 0%. A user inputs a low value in the case where the user desires to enhance the blurring effect and inputs a high value in the case where the user desires to reduce the blurring effect in the setting item of "Expected blurring ratio" on the detailed setting UI screen (FIGS. 6A and 6B) of the previously-described sheet setting. In the example in FIG. 6A described previously, "80" is input as the setting value, and therefore, it is known that the user desires that an image that is printed on the back side shows through the front side in a degree of 80%.

Figure 11A:
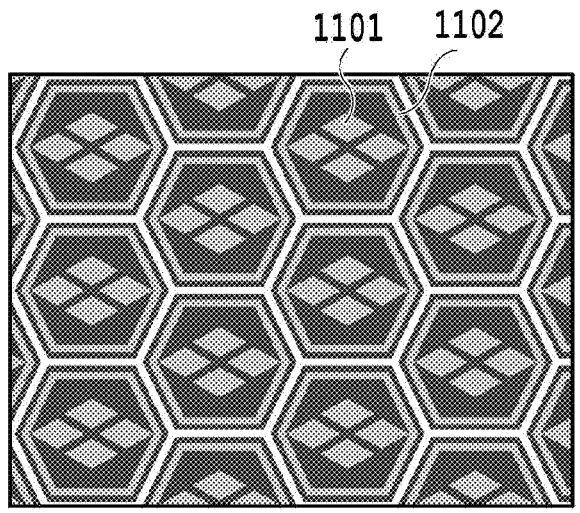
FIGS. 11A-11C are diagrams showing examples of a small pattern image.
Figure 11B:
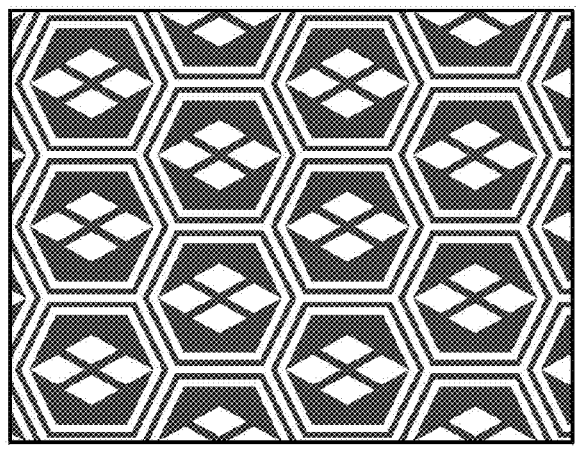
Figure 11C:
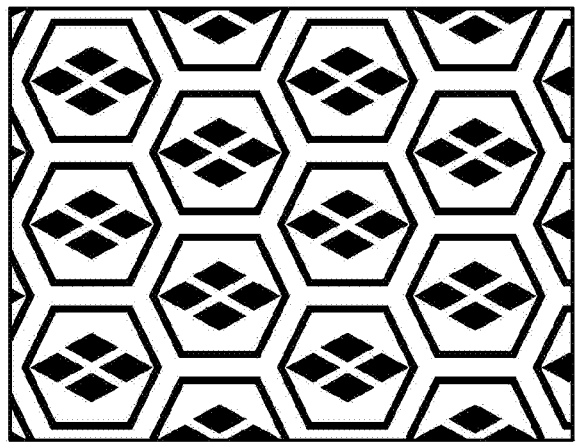

Here, explanation is given by using a print job in which an image of a small pattern on which rhombuses are arranged in hexagons is printed on the back side of a Semitransparent film (ML1) as an example. FIG. 11A shows a small pattern image that is printed on the back side of a semitransparent sheet and the image can be seen through a viewer of a job management tool. FIG. 11B shows a state where the small pattern image in FIG. 11A is observed from the front side of the semitransparent sheet. In the small pattern image shown in FIG. 11A, the portion of a rhombus 1101 and the portion of a frame 1102 inside the hexagon have the same density and the color of which is pale (low density lower than the registered translucency reference value Dt (50%)). Consequently, in the case where the small pattern image is seen from the front side, the color of the portion of the rhombus 1101 and the color of the portion of the frame 1102 inside the hexagon do not show through and cannot be visually recognized, and therefore, they are indicated in white not in pale gray. FIG. 11C is an image (flag file) indicating a area that cannot be visually recognized from the front side, which is obtained by comparing the translucency reference value (Dt) registered in advance with the density of each pixel in the small pattern image shown in FIG. 11A.

In the present embodiment, in the case where the above-described expected blurring ratio is registered, in the preflight processing that is performed in the printing control apparatus 101, processing to find a blurring ratio that is predicted (hereinafter, predicted blurring ratio) is performed. Hereinafter, detailed explanation is given.

Figure 12:
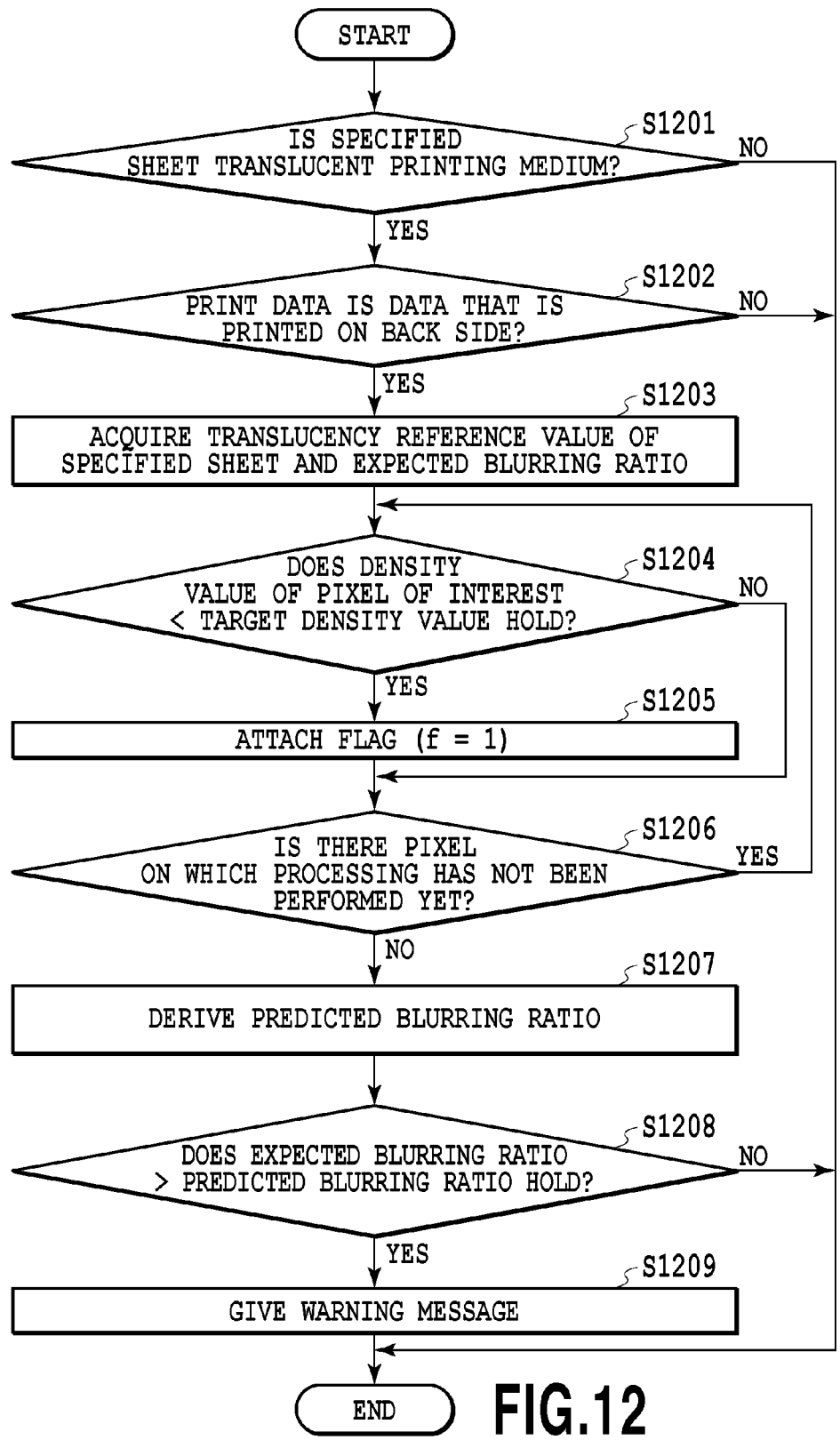
FIG. 12 is a flowchart showing a flow of show-through determination processing in preflight processing according to a second embodiment.

FIG. 12 is a flowchart showing a flow of show-through determination processing in the preflight processing according to the present embodiment. The processing at steps 1201 to 1206 corresponds to the processing at steps 1001 to 1006 in the flowchart in FIG. 10 of the first embodiment, respectively, and therefore, explanation is omitted. However, the processing at step 1203 differs from the processing at the corresponding step of the first embodiment in that information on the expected blurring ratio is acquired, in addition to the information on the registered translucency reference value of the specified sheet.

After the processing at up to step 1205 is completed for all the pixels within the print data (No at step 1206), the CPU 207 finds a predicted blurring ratio (Re) described above. Specifically, first by using expression (2) below, a ratio (Ruv) indicating what percent of the printed portion of the print data is accounted for by the invisible area is found.

$$R_{uv} = \frac{S_f}{S_{all}} \quad \text{expression (2)}$$

In the above-described expression (2), $S_f$ denotes the invisible area and $S_{all}$ denotes the printed portion (area) in the print data. The "printed portion in the print data" indicates the area other than the portions in which the pixel value is 0 (blank portions) in the image to be printed. Here, how the predicted blurring ratio (Re) is found is explained in the case where the print data is data related to a print job in which printing is performed on an A4 size sheet (210 mm×297 mm) at a resolution of 600 dpi. First, the blank area in the print data to be printed is found by counting the number of portions in which the pixel value is "0". Here, it is assumed that the number of pixels whose pixel value is "0" is 1,802,529. The invisible area ($S_f$) corresponding to the above-described flag file has already been found from the results of the processing at step 1204 and step 1205 (here, 6,960,505 pixels are assumed), and saved in the HDD 204. Then, the printed portion ($S_{all}$) of the print data is found by expression (3) below.

$$S_{all} = [\text{printed size } (A4, 600 \text{ dpi})] - [\text{blank area} \\ (C=M=Y=K=0)]$$

$$[210 \times 297 \div 25.4 \div 25.4 \times 600 \times 600] - [1{,}802{,}529] = 33{,}000{,}\\ 000 \text{ (pixel)} \quad \text{expression (3)}$$

Then, the ratio of invisibility (Ruv) is as follows.

$$R_{uv} = \frac{S_f}{S_{all}} = \frac{6960505}{33000000} = 21(\%)$$

As a result of this, the predicted blurring ratio (Re) is found as follows.

$$Re = 1 - Ruv = 1 - 0.21092439 \approx 79(\%)$$

In this manner, the predicted blurring ratio (Re) is found.

At step 1208, the CPU 207 determines whether the predicted blurring ratio derived at step 1207 reaches the expected blurring ratio acquired at step 1203. For example, in the case where the predicted blurring ratio (Re) derived as described above is 79% and the expected blurring ratio that has been set is 80%, it will be determined that the predicted blurring ratio does not reach the expected blurring ratio. In the case where the derived predicted blurring ratio does not reach the expected blurring ratio, the processing proceeds to step 1209. On the other hand, in the case where the derived predicted blurring ratio reaches the expected blurring ratio, the present processing is exited.

At step 1209, the CPU 207 gives a notification (warning) to a user by displaying, for example, a message to the effect that there is a possibility that the blurring ratio expected by the user cannot be obtained on the screen of the operation unit 205.

The above is the contents of the preflight processing according to the present embodiment.

After the predicted blurring ratio derivation processing (step 1207) ends, for example, it may also be possible to enable a user to check which portion will be the invisible area by displaying a predicted image (corresponding to the image in FIG. 11B) after the processing on the viewer of the job management tool. Alternatively, it may also be possible to display an image (the flag file shown in FIG. 11C) indicating the invisible area on the viewer of the job management tool. Due to this, it is possible for a user to easily know the portion that needs modification.

In the present embodiment, the processing is performed on the entire print data, but it may also be possible to divide the print data into a plurality areas (blocks) and to perform the processing on each obtained block. Alternatively, it may also be possible to perform the processing on each object such as the small pattern.

According to the present embodiment, by registering the degree in which blurring is applied for each translucent printing medium in advance, it is possible for a user to grasp whether the blurring effect as expected can be obtained before printing.

Third Embodiment

As described in the first embodiment, in the image forming system, a plurality of kinds of translucent printing media can be registered (in the list box 401 on the sheet setting UI screen in FIG. 4 described previously, the two kinds of semitransparent films (ML1, ML2) are displayed). Consequently, an aspect is explained as a third embodiment, in which in the case where a certain translucent printing medium is determined to be difficult to visually recognize, a user is also notified of another translucent printing medium having a great possibility of being recognized visually among the registered translucent printing media.

Explanation of the portions in common to those of the first and second embodiments is omitted or simplified and in the following, different points are explained mainly.

FIG. 13 is a flowchart showing a flow of show-through determination processing in the preflight processing according to the present embodiment.

Upon receipt of instructions to perform the preflight processing from a user, at step 1301, the CPU 207 initializes the value of $\delta_{max}$ (maximum value of a difference ($\delta$) between the density value of each pixel within the print data and the target density value) that is used at step 1306, to be described later.

The processing at steps 1302 to 1305 corresponds to that at steps 1001 to 1004 in the flowchart in FIG. 10 of the first embodiment, respectively, and therefore, explanation is omitted.

In the case where it is determined that the density value of the pixel of interest is lower than the target density value at step 1305, the CPU 207 determines whether the difference $\delta$ between the density value of the pixel of interest and the target density value is the maximum among the differences $\delta$ that have been obtained in the processing hitherto at step 1306. Specifically, the CPU 207 determines whether $\delta > \delta_{max}$ by comparing the difference $\delta$ between the density value of the pixel of interest, which is the target of the processing, and the target density value with the above-described $\delta_{max}$. In the stage immediately after the start of the processing, the value of $\delta_{max}$ is initialized and "0" is input, and therefore, it is determined that $\delta > \delta_{max}$ without exception. In the case where it is determined that $\delta > \delta_{max}$ the processing proceeds to step 1307. On the other hand, in the case where it is determined that $\delta > \delta_{max}$ does not hold, the processing proceeds to step 1309.

At step 1307, the CPU 207 updates the value of $\delta_{max}$ (the value of $\delta$ is substituted for $\delta_{max}$).

At step 1308, the CPU 207 saves the density value of the pixel of interest and information on the position thereof in the second memory 208 etc. By repeating the processing at steps 1306 to 1308, the pixel whose difference $\delta$ from the target density value is the largest (i.e., the pixel having the lowest density value) is finally specified within the print data.

At step 1309, the CPU 207 sets a flag indicating that the pixel is a pixel that does not show through to the pixel of interest determined to be a pixel that does not shown through.

At step 1310, the CPU 207 determines whether the processing has been completed for all the pixels within the print data. In the case where there is a pixel on which the processing has not been performed yet, the processing returns to step 1305 and the processing is continued for the next pixel of interest. On the other hand, in the case where the processing has been completed for all the pixels, the processing proceeds to step 1311.

At step 1311, the CPU 207 determines whether a pixel determined to be a pixel that does not show through exists in the print data (whether a pixel whose flag value is 1 exists). In the case where the results of the determination indicate that a pixel that does not show through exists, the processing proceeds to step 1312. On the other hand, in the case where a pixel that does not show through does not exist, the present processing is exited.

At step 1312, the CPU 207 searches for another translucent printing medium (alternative printing medium) through which the image that is printed on the back side of the sheet shows through without any problem from among the plurality of registered translucent printing media. Specifically, the CPU 207 searches for a translucent printing medium having a translucency reference value corresponding to a density lower than the density value (the lowest density value in the print data) that has been saved at step 1308.

At step 1313, the CPU 207 gives a warning to the effect that there is a possibility that the object that should originally show through the front side of the sheet will not be recognized visually by, for example, displaying a message, as in the first embodiment. Then, in the case where an alternative printing medium has been searched for at step 1312 described above, the CPU 207 presents the translucent printing medium optimum to the printing of the print data as well as giving the above-described warning. At this time, in the case where there is a plurality of translucent printing media having a translucency reference value corresponding to a density lower than the lowest density value in the print data, it may also be possible to, for example, select and present one translucent printing medium having the highest translucency reference value from among the plurality of translucent printing media, or to display all the translucent printing media in a list.

Although the present embodiment is explained based on the first embodiment, it is also possible to apply the present embodiment based on an aspect in which the blurring ratio according to the second embodiment is used. In other words, such an aspect may be accepted in which an alternative printing medium that satisfies the expected blurring ratio is presented at step 1313.

According to the present embodiment, it is made possible to easily select an optimum translucent printing medium in accordance with a print job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-040663, filed Mar. 3, 2014 which is hereby incorporated by reference wherein in its entirety.

What is claimed is:

1. An image processing apparatus comprising:
   a unit configured to acquire a translucency reference value indicating optical translucency in a specified translucent printing medium;
   a show-through determination unit configured to determine whether an image that is formed on the translucent printing medium in accordance with print data shows through by determining whether there exists a difference between the density of a pixel in the print data and the density specified by the acquired translucency reference value and whether the density of the pixel in the print data is lower than the density specified by the translucency reference value; and
   a first determination unit configured to determine whether a user should be notified of information about whether an image that is formed on the translucent printing medium in accordance with the print data shows through in accordance with the results of the determination by the show-through determination unit.

2. The image processing apparatus according to claim 1, wherein
   the show-through determination unit determines that the image does not show through in a case where there exits a difference between the density of the pixel in the print data and the density specified by the acquired translucency reference value and in a case where the number of pixels in the print data, the density of which is determined to be lower than the density specified by the translucency reference value, exceeds a predetermined threshold value.

3. The image processing apparatus according to claim 1, wherein
   in the case where the show-through determination unit determines that the image does not show through, the first determination unit determines that a user should be notified of the results of the determination.

4. The image processing apparatus according to claim 1, further comprising:
   a unit configured to acquire an expected blurring ratio as a reference of blurring in a specified translucent printing medium;
   a unit configured to, in a case where an image according to print data is printed on a first side of the specified translucent printing medium, derive a predicted blurring ratio indicating a degree of blurring with which the image is seen from a second side different from the first side; and
   a blurring ratio determination unit configured to determine whether the derived predicted blurring ratio reaches the acquired expected blurring ratio.

5. The image processing apparatus according to claim 4, wherein
   the predicted blurring ratio (Re) is found by an expression below $$Re = 1 - Ruv, \text{ and}$$

Ruv is found by an expression below $$R_{uv} = \frac{S_f}{S_{all}}$$

where $S_f$ denotes an invisible area of the image according to the print data and $S_{all}$ denotes a portion where the pixel value is not 0 of the image according to the print data.

6. The image processing apparatus according to claim 5, wherein
   the invisible area is an area corresponding to a pixel determined to be a pixel that does not show through by the show-through determination unit.

7. The image processing apparatus according to claim 4, further comprising a second determination unit configured to, in a case where it is determined that the derived predicted blurring ratio does not reach the acquired expected blurring ration by the blurring ratio determination unit, notify a user of the results of the determination.

8. The image processing apparatus according to claim 7, wherein
   the second determination unit further determines that an image indicating the invisible area should be displayed in the case where the notification is made.

9. The image processing apparatus according to claim 1, further comprising a search unit configured to search for another translucent printing medium that satisfies the acquired translucency reference value in the case where it is determined that the image does not show through by the show-through determination unit, wherein
   in a case where the search unit has searched for another translucent printing medium that satisfies the acquired translucency reference value, the first determination unit determines that the other translucent printing medium should be presented to a user.

10. The image processing apparatus according to claim 1, wherein
    the acquisition unit acquires a translucency reference value set for each color of color materials used in the printing.

11. An image processing method comprising the steps of:
    acquiring a translucency reference value indicating optical translucency in a specified translucent printing medium;
    determining whether an image that is formed on the translucent printing medium in accordance with print data shows through by determining whether there exists a difference between the density of a pixel in the print data and the density specified by the acquired translucency reference value and whether the density of the pixel in the print data is lower than the density specified by the translucency reference value; and
    determining whether a user should be notified of information about whether an image that is formed on the translucent printing medium in accordance with the print data shows through in accordance with the results of the determination in the determination step.

12. A non-transitory computer readable storage medium storing a program for causing a computer to perform the method according to claim 11.

* * * * *